(12) United States Patent
Havey et al.

(10) Patent No.: US 6,650,305 B1
(45) Date of Patent: Nov. 18, 2003

(54) WIRELESS ELECTRONIC DISPLAY

(75) Inventors: Gary D. Havey, Maple Grove, MN (US); Steven A. Lewis, Edina, MN (US)

(73) Assignee: Honeywell Inc., Morristown, NJ (US)

( * ) Notice: Subject to any disclaimer, the term of this patent is extended or adjusted under 35 U.S.C. 154(b) by 0 days.

(21) Appl. No.: 09/165,964

(22) Filed: Oct. 2, 1998

(51) Int. Cl.$^7$ .................................................. G09G 5/00
(52) U.S. Cl. ........................ 345/8; 345/2.1; 345/158; 345/169; 345/901; 345/905; 340/825.6; 340/825.72; 359/13; 359/630; 359/642
(58) Field of Search ................... 345/2, 8, 158, 345/169, 901, 905; 340/825.6, 825.72; 359/13, 630, 642

(56) References Cited

U.S. PATENT DOCUMENTS

| | | |
|---|---|---|
| 3,818,125 A | 6/1974 | Butterfield |
| 3,971,013 A | 7/1976 | Challoner |
| 4,025,903 A | 5/1977 | Kaufman |
| 4,060,848 A | 11/1977 | Hyatt |
| 4,090,219 A * | 5/1978 | Ernstoff et al. ............. 348/742 |
| 4,224,615 A | 9/1980 | Penz |
| 4,257,306 A | 3/1981 | Laflamme |
| 4,274,093 A | 6/1981 | Judge |
| 4,310,849 A | 1/1982 | Glass |
| 4,545,023 A | 10/1985 | Mizzi |
| 4,559,555 A | 12/1985 | Schoolman |
| 4,636,866 A | 1/1987 | Hattori |
| 4,639,225 A | 1/1987 | Washizuka |
| 4,706,117 A | 11/1987 | Schoolman |
| 4,737,972 A | 4/1988 | Schoolman |
| 4,758,717 A | 7/1988 | Shepard |
| 4,905,001 A | 2/1990 | Penner |
| 4,916,441 A | 4/1990 | Gombrich |
| 4,931,950 A | 6/1990 | Isle |
| 4,994,987 A | 2/1991 | Baldwin |
| 5,003,300 A | 3/1991 | Wells |
| 5,015,831 A | 5/1991 | Eastman |

(List continued on next page.)

FOREIGN PATENT DOCUMENTS

| | | |
|---|---|---|
| DE | 196 42 267 A1 | 5/1998 |
| EP | 0 809 172 A2 | 11/1997 |
| EP | 0 823 813 A2 | 2/1998 |
| GB | 1 264 343 A | 2/1972 |
| WO | WO 97/03434 | 1/1997 |
| WO | WO 98/43145 | 10/1998 |
| WO | WO 99/57628 | 11/1999 |

Primary Examiner—Bipin Shalwala
Assistant Examiner—Vincent E. Kovalick (57) ABSTRACT

The present invention is a portable electronic video display. The display is configured to be worn on the arm or wrist of a user, or stored in a pocket or backpack. The display is raised to eye level and the user looks through an eyepiece to view the video display. Control buttons are located on the display for generating point and click type commands. The display is meant to be used remotely from a computer. The computer could be worn or carried by the person or simply be free standing, some distance away. The computer is configured to convert video signal into a serial data stream and then transmit that stream via an RF signal. The display then receives that signal and converts it back into a video signal, displaying it on a miniature electronic video display. That image is them magnified through various optics to present a final image to the user. The point and click commands are separately transmitted back to the computer, where they are received and acted upon.

13 Claims, 7 Drawing Sheets

U.S. PATENT DOCUMENTS

| | | | |
|---|---|---|---|
| 5,035,474 A | 7/1991 | Moss | |
| 5,052,504 A | 10/1991 | Ikeda | |
| 5,144,119 A | 9/1992 | Chadima | |
| 5,148,155 A | 9/1992 | Martin | |
| 5,175,534 A | 12/1992 | Thatcher | |
| 5,189,512 A * | 2/1993 | Cameron et al. | 348/838 |
| 5,208,449 A | 5/1993 | Eastman | |
| 5,252,950 A | 10/1993 | Saunders | |
| 5,267,181 A | 11/1993 | George | |
| 5,281,957 A | 1/1994 | Schoolman | |
| 5,285,398 A | 2/1994 | Janik | |
| 5,305,244 A | 4/1994 | Newman | |
| 5,394,517 A | 2/1995 | Kalawsky | |
| 5,408,359 A | 4/1995 | Ferrett et al. | |
| 5,432,510 A | 7/1995 | Matthews | |
| 5,450,596 A | 9/1995 | Felsenstein | |
| 5,491,651 A | 2/1996 | Janik | |
| 5,514,861 A | 5/1996 | Swartz et al. | |
| 5,543,816 A * | 8/1996 | Heacock | 345/8 |
| 5,550,585 A | 8/1996 | Cherri | |
| 5,572,343 A | 11/1996 | Okamura | |
| 5,579,165 A | 11/1996 | Michel | |
| 5,581,271 A * | 12/1996 | Kraemer | 345/8 |
| 5,638,202 A | 6/1997 | Rofe | |
| 5,642,129 A * | 6/1997 | Zavracky et al. | 345/100 |
| 5,673,059 A * | 9/1997 | Zavracky et al. | 345/8 |
| D385,855 S | 11/1997 | Ronzani | |
| 5,719,744 A | 2/1998 | Jenkins et al. | |
| 5,740,037 A | 4/1998 | McCann et al. | |
| 5,786,866 A * | 7/1998 | Sani et al. | 348/520 |
| 5,822,021 A * | 10/1998 | Johnson et al. | 348/742 |
| 5,825,675 A | 10/1998 | Want | |
| 5,964,830 A | 10/1999 | Durret | |
| 5,991,085 A * | 11/1999 | Rallison et al. | 359/630 |
| 5,995,705 A * | 11/1999 | Lang | 386/46 |
| 6,046,712 A * | 4/2000 | Beller et al. | 345/8 |
| 6,088,053 A | 7/2000 | Hammack | |
| 6,181,302 B1 | 1/2001 | Lynde | |
| 6,181,371 B1 | 1/2001 | Maguire, Jr. | |
| 6,227,043 B1 * | 5/2001 | Schoenbeck et al. | 73/116 |
| 6,233,094 B1 | 5/2001 | Tsuda | |
| 6,452,572 B1 * | 9/2002 | Fan et al. | 345/8 |

\* cited by examiner

WIRELESS ELECTRONIC DISPLAY

BACKGROUND OF THE INVENTION

This invention relates generally to portable color video displays and specifically to high resolution miniature wireless displays.

DESCRIPTION OF THE RELATED ART

There are many applications where it is beneficial to have access to a computer outside of the normal office environment. For instance, soldiers in an unfamiliar environment would benefit from having an interactive color map of an area which corresponded to their immediate position. Another example would be a mechanic or technician, working on a complicated piece of equipment who would appreciate having instant access to the relevant schematics or perhaps a full motion video detailing the components and a particular procedure. Computer generated displays of this data are ideal because they allow access to a vast amount of data and allow the user to focus in on specific information with the desired level of detail. Traditional portable computer systems (such as a laptop) can certainly perform these functions; however, they are not always conducive to it.

For instance, the above-described orienteering soldier would not want to stop moving and open up a bulky laptop each time he wanted to check or confirm his position. First, doing so would stop his forward progress and take his attention away from the matter at hand. Second, the use of such a display emits a large amount of light and would effectively prevent its use during night time or covert operations.

Alternatively, smaller hand-held, task-specific devices such as a hand held GPS or palmtop computer could be used. These devices often lack the ability to perform multiple tasks, the displays are often large and cumbersome, and the entire unit (the display and the controls) must be handled for each use. Once again, this causes the operator to be distracted from the task at hand and makes storing or concealing the device more difficult.

An intermediate combination is the concept of the body worn computer. These devices allow the processor to be strapped to the body or carried in a backpack. Often the display will be tethered to the computer and positioned on or carried by another part of the body. For instance, the processor may be strapped to the back, and the display may be hand held. A wire connecting the two would run along the arm of the user. Alternatively, the processors may be connected to a head mounted display. In either case, it is easier to simply present a display, rather than incorporating an interface into the unit. In the case of the tethered display, the unit size must be increased in order to add the data transmission characteristics, thereby reducing the effectiveness of separating components. With the head mounted displays, a whole new hand operable controller must generally be added. Again this increases the size and mass of the overall unit as well as providing more wires and components, which can become entangled and interfere with the task at hand.

Various types of these head mounted displays are presently available. The most straightforward of these has a monocular arrangement which presents a continuous video stream to one eye of the user. The user is then limited to having only one eye to view his surroundings with. Alternatively, a helmet having a visor could be configured so that data is projected onto the visor and reflected into the eye. The user can then selectively focus on either the data being projected or the surrounding environment. This arrangement is bulky and is not conducive to enclosed working conditions.

The problem with these and any other head mounted displays is that data is continuously being presented to the operator. For many applications this is not only unnecessary, but it can often be very distracting. Furthermore, no matter how compact the head mounted display is made, the user is always tethered to the processing unit which is attached to some portion of his body. In addition, in order for members of a group to each be able to view such information, each member must have his own system. Therefore, there is a need to provide a small, easily portable, wireless, high resolution display that is ideally suited for quick look applications.

SUMMARY OF THE INVENTION

The present invention is a portable or body worn electronic computer display. The display is remotely coupled to a stand alone computer, either worn by the operator or located some distance from him. This configuration allows the computer to be located in a convenient location and the operator has complete mobility around it. Furthermore, if the computer is carried by the operator, such as in a backpack, the link to the display is entirely unobtrusive.

In order to deliver the video information from the computer to the remote display, the data must be converted into a transmittable format. The computer includes a data converter for formatting a video signal into a serial data stream and a transmitter for subsequently transmitting the data stream to the remote display.

The data is received by a receiver and an antenna located within the housing of the display and is subsequently converted back into a video signal.

The converted video data is then sent to a miniature electronic color display where a color sequential image is produced. The image is transmitted through a field flattening lens in order to preserve its proportions and to optically align the image with the remainder of the optical components.

The LCD color shutters are cycled to convert the white display images into three sequential red, green, and blue color images. When viewed by the human eye, these separate images are integrated into a normal color image.

The separate color images pass through a reflective prism. The prism serves to increase the focal length while maintaining an optimally sized housing. Optically, aligned with the prism is an eyepiece lens. The operator simply looks through the eyepiece lens and views the complete color composite image.

The display also incorporates a data transmitter for sending point and click type data back to the computer in order to control and manipulate the software.

DETAILED DESCRIPTION OF PREFERRED EMBODIMENTS

Figure 1:
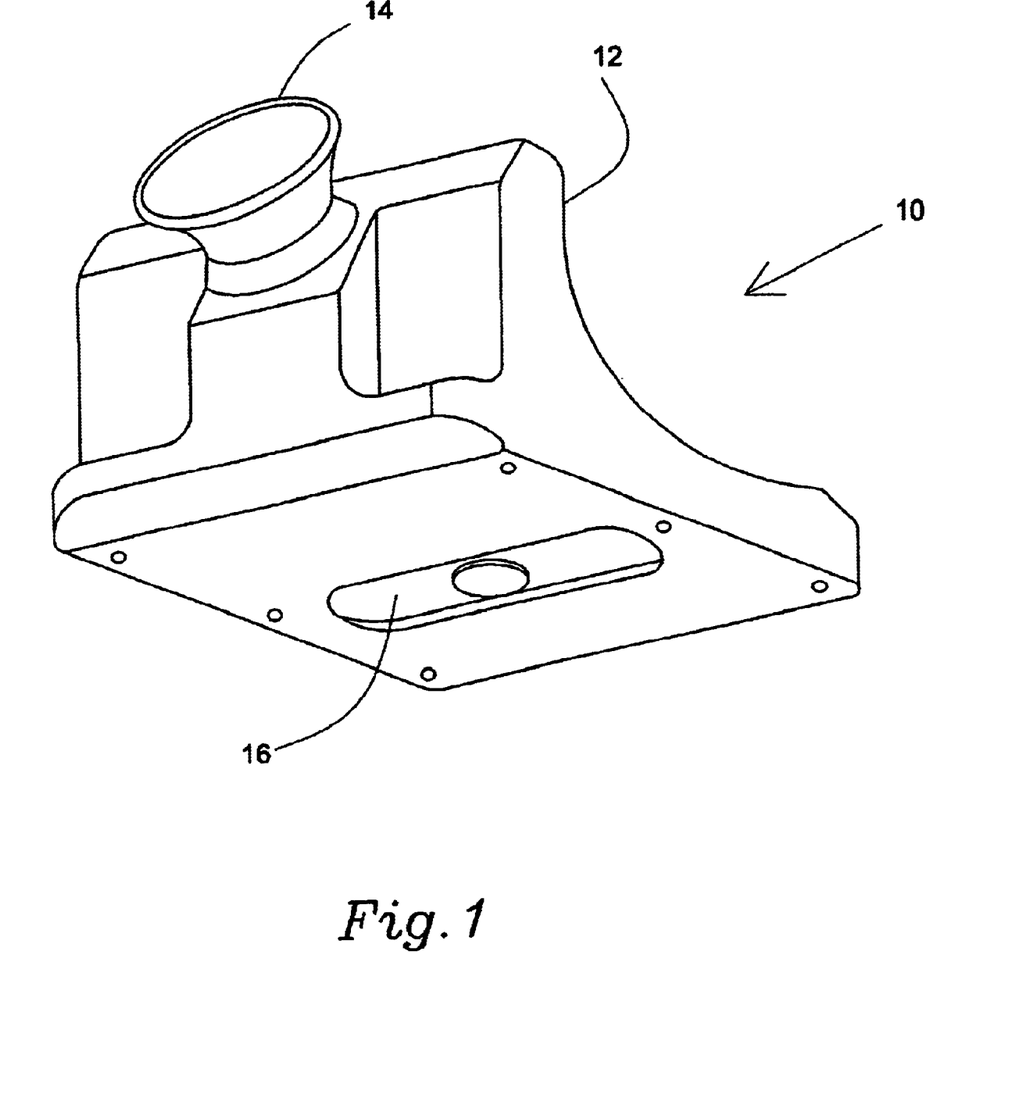
FIG. 1 is a front perspective view of the portable electronic display.

FIG. 1 shows a viewer 10 having a main housing 12. The housing should be constructed from a suitably rigid, yet lightweight material such as plastic. Some metal may be appropriate, however it should be selected so as to not interfere with the reception and transmission of the RF signal described below. The housing 12 is configured to be worn on various parts of the body or carried in a pocket or backpack. When worn, the housing 12 has an adjustable strap 11 to hold the device in place. Eyecup 14 projects from the housing 12 and the operator places his eye in the eyecup to view the displayed image. Data input control 16 is located on a bottom face of the housing 12 and allows the user to input various commands which will be transmitted back to a main processing unit. Generally, any of the point and click type inputs could be used, such as the traditional mouse, roller ball, or touch pad. Here, the data input control 16 has a force sensing resistor array with a rubber overlay which senses pressure from the operator. Membrane switches are used instead of traditional buttons. This arrangement provides an input control that does not have any moving parts.

Figure 2:
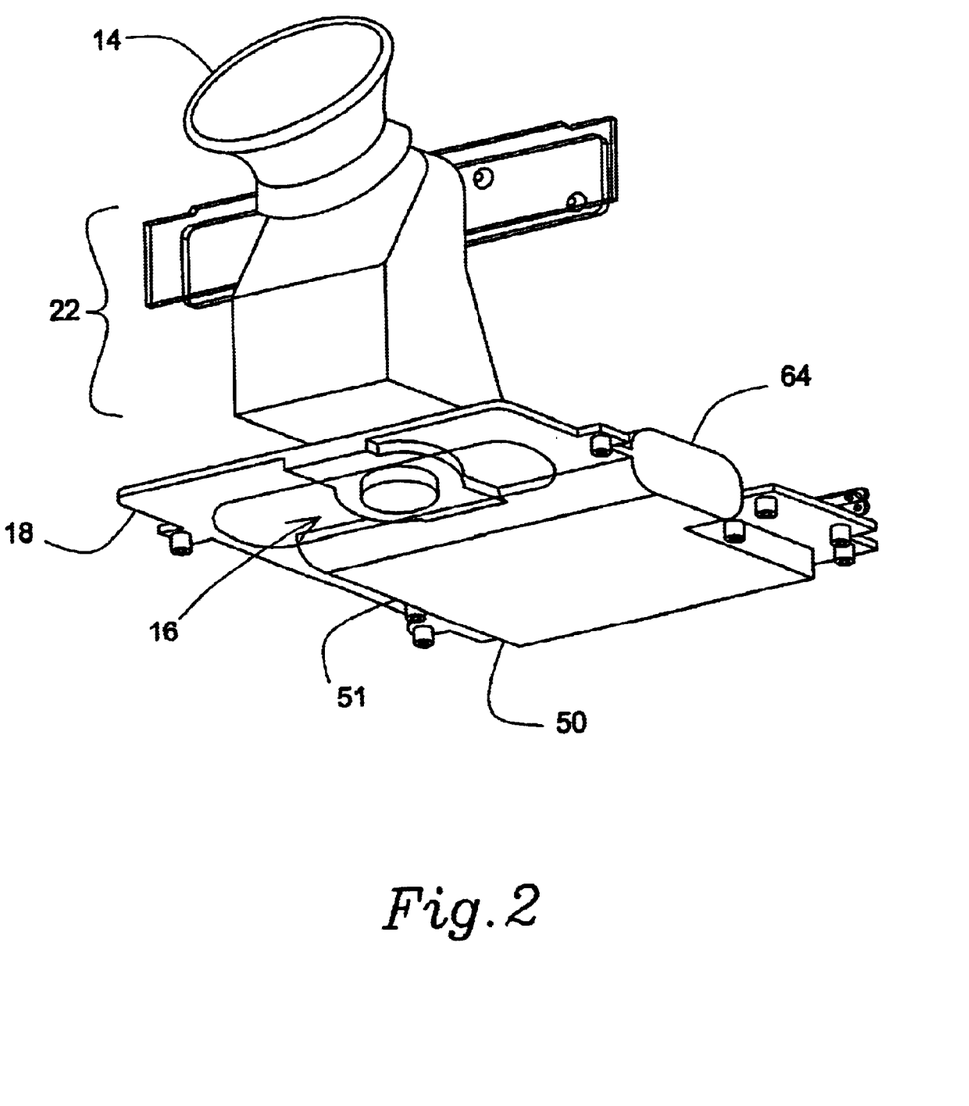
FIG. 2 is a front perspective view of the internal components of the portable electronic display.

FIG. 2 shows the internal components of the wireless display unit. The eyecup 14 is coupled to an optics assembly 22 which provides for the optical transmission of the display signal. A signal sent from a remote computer is transmitted to RF receiver 50 where it is converted into a video display. Data input control 16 is operated like a traditional computer mouse and transmits the control signals back to the stand-alone computer 58. Battery 64 provides power for the receiver, the transmitter and the optical arrangement.

Figure 3:
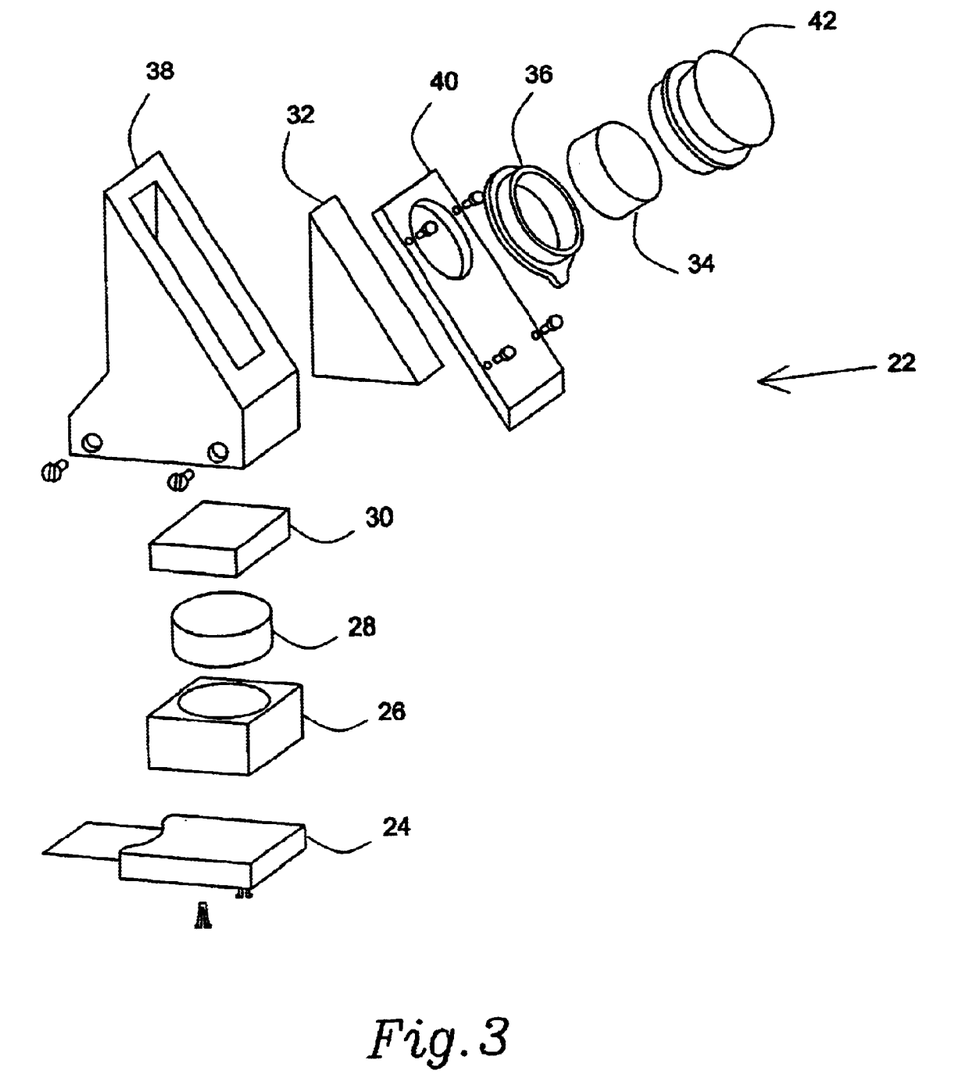
FIG. 3 is an exploded view of the optical components of the portable electronic display.

Turning to FIG. 3, the optics assembly 22 will be explained in detail. Miniature electronic display 24 is coupled to, and receives signals from, RF receiver 50. Any suitably sized display could be used, including either color or black and white, dependent on the final application. Furthermore, various types of displays could be used, indicating: LCD, FED or OLED. Additionally, the display could present a spatial color image or a sequential color image. The selection of the type of display is secondary to obtaining a suitably small display having sufficient resolution. Here, an Active Matrix Electroluminescent display presents a color sequential image. The display should be capable of displaying in a resolution of 640×480 or greater. That image is then projected through a field flattening lens 28 which is held in place by the lens holder 26. The field flattening lens 28 serves to insure that the final image viewed by the operator contains a direct and complete view of the rectangular image produced by the display 24. Subsequently, light transmitted by display 24 through field flattening lens 28 passes through a subtractive LCD color shutter 30. LCD color shutter 30 cycles between red, green and blue so as to produce a composite color image from the color sequential images produced by the display 24. The image then enters reflective folding prism 32. Folding prism 32 serves to allow the focal length of the optics assembly 22 to be increased without significantly increasing the overall linear dimensions of the display housing. The field flattening lens 28, the LCD color shutter 30, and the reflecting folding prism 32 are mounted in a prism housing 38. Attached to an upper surface of prism housing 38 is a prism housing face 40. A doublet lens 34 is mounted on the prism housing face 40 and is held in place by lens mount 36. Doublet lens 34 serves to clarify and magnify the image presented to the operator. Subsequently coupled to the doublet lens mount 36 is an eyecup holder 42 and a suitably sized eyecup 14 slips over eyecup holder 42.

Figure 4:
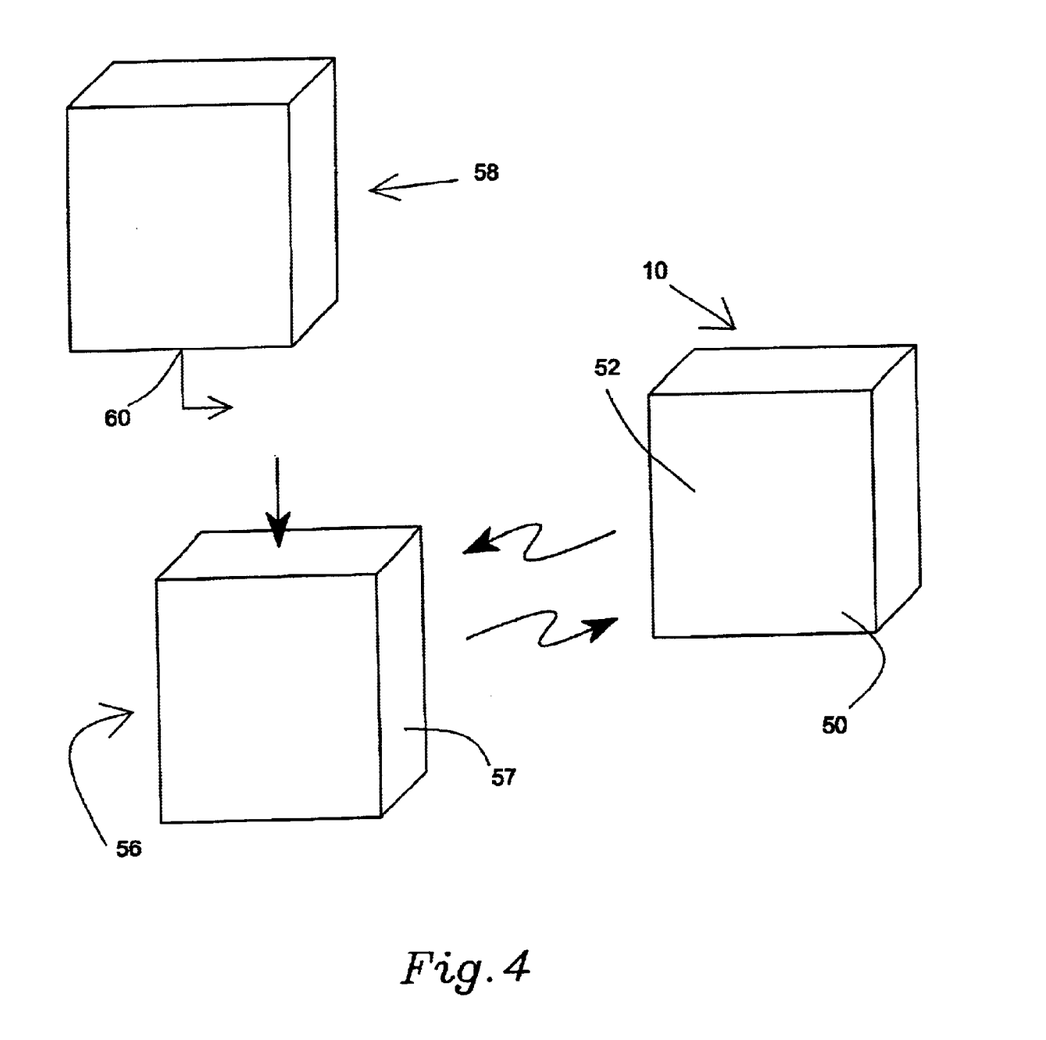
FIG. 4 is block diagram of the components of the computer using the portable electronic display.

Turning now to FIG. 4, the data transmission protocol of the system will be explained. A stand-alone computer 58 has a standard 15 pin VGA connector which is coupled to an RF data transmitter 56 which also includes an analog to digital converter 57. The A/D converter 57 samples each of the RGB signals and optimizes the data to match one of the standard VGA colors. This data is combined with the appropriate horizontal and vertical sync control signals. The resulting data stream is unique in that no accidental control signals can be generated by incorrectly combining a portion of any data signal with a portion of any other data signal. In other words, the data code allows for the constant and accurate interpretation of the control signals. This data is then serially transmitted in an interlaced format, i.e. the first frame contains the even-numbered lines and the second frame contains the odd-numbered lines. Because there is a sufficiently high refresh rate, the human eye will integrate the split frames into a single image. This serially encoded data is then transmitted. The rate at which it is transmitted is ultimately application specific. However, there would be a general desire to have a smooth and continuous image and even be capable of transmitting video. The system in this embodiment was set up to transmit at 53 megabits per second, which requires 106 MHz of bandwidth. The RF receiver 50 then receives a signal via antenna 51 and converts it back to a 16 color VGA signal. Display 24 is refreshed at 60 frames per second, but since it is an interlaced signal, the image is perceived at 30 frames per second.

Figure 5:
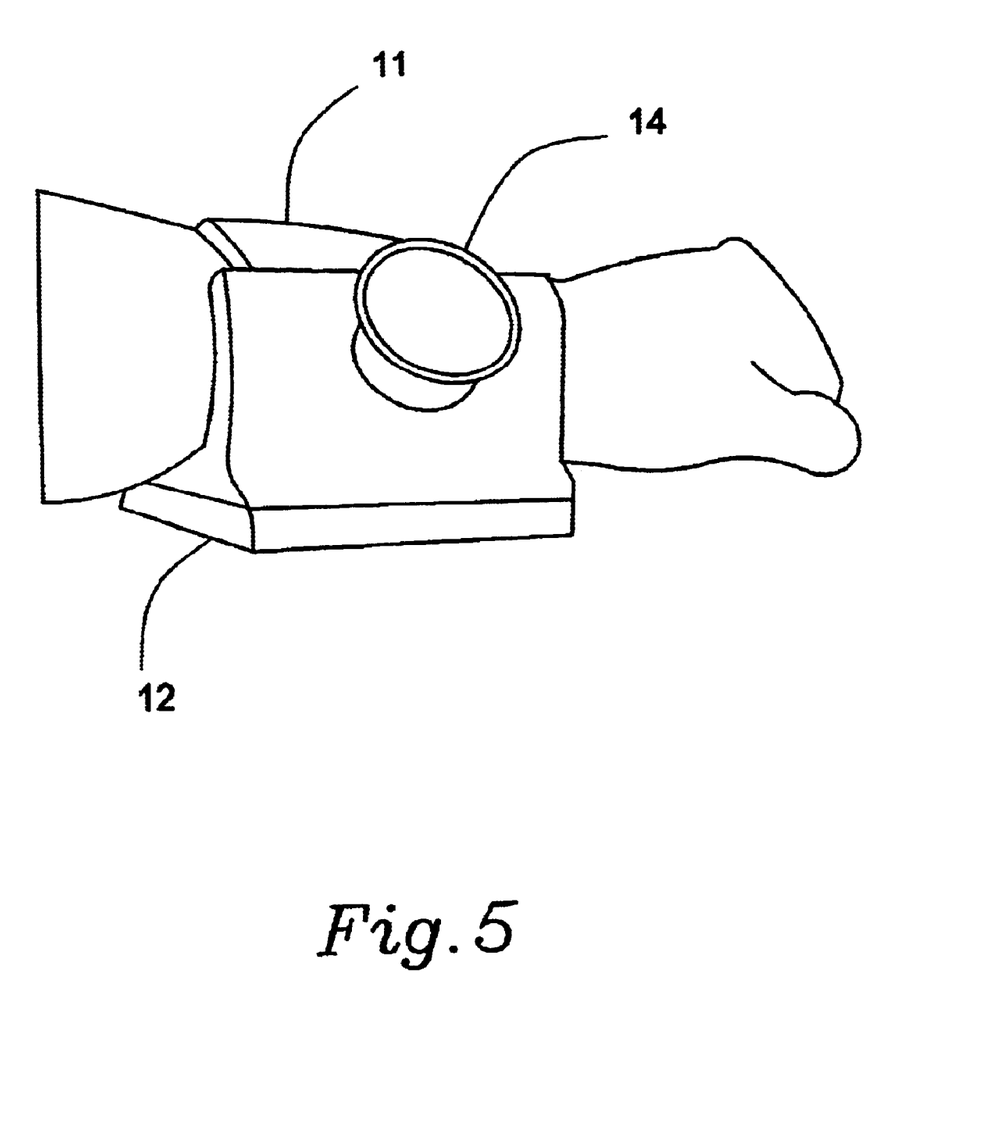
FIG. 5 is a perspective view of the portable electronic display being worn on the wrist of an operator.
Figure 6:
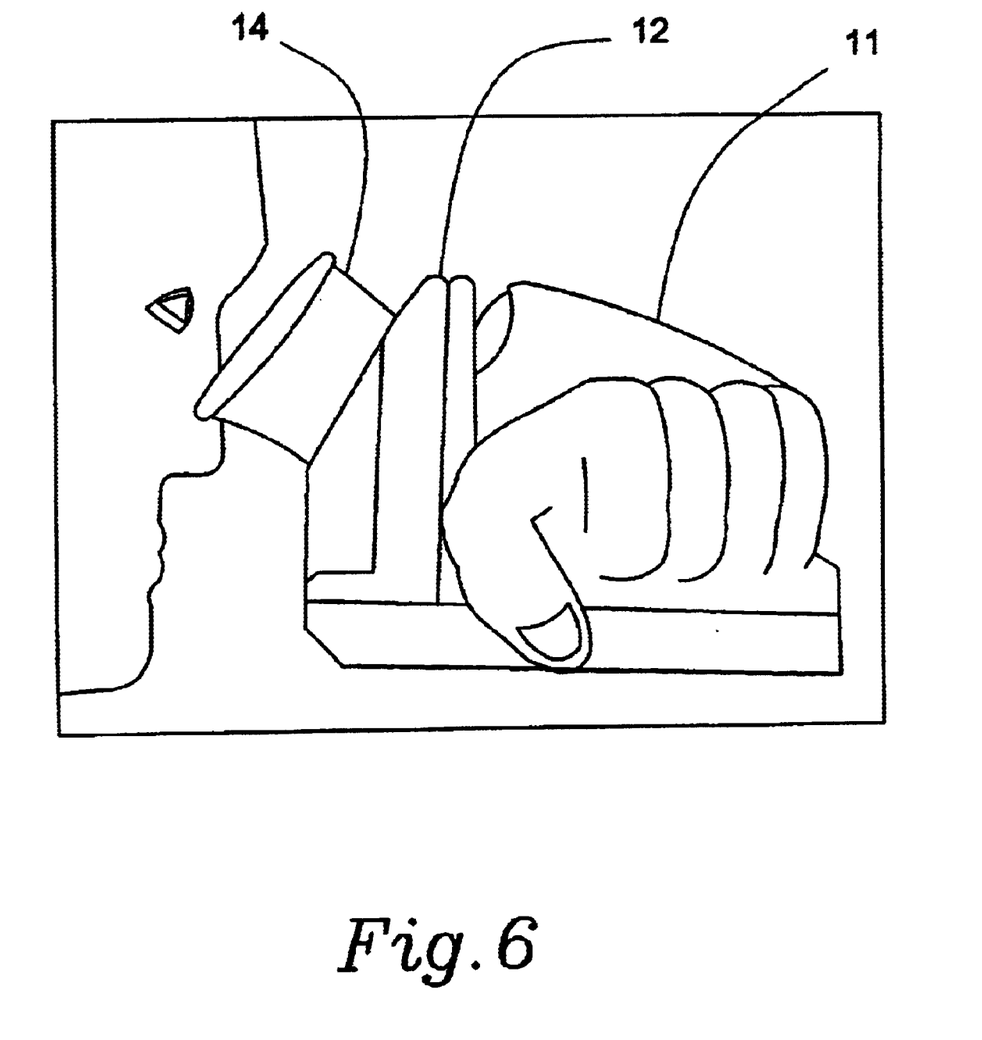
FIG. 6 is a perspective view of the portable electronic display as the operator views an image.
Figure 7:
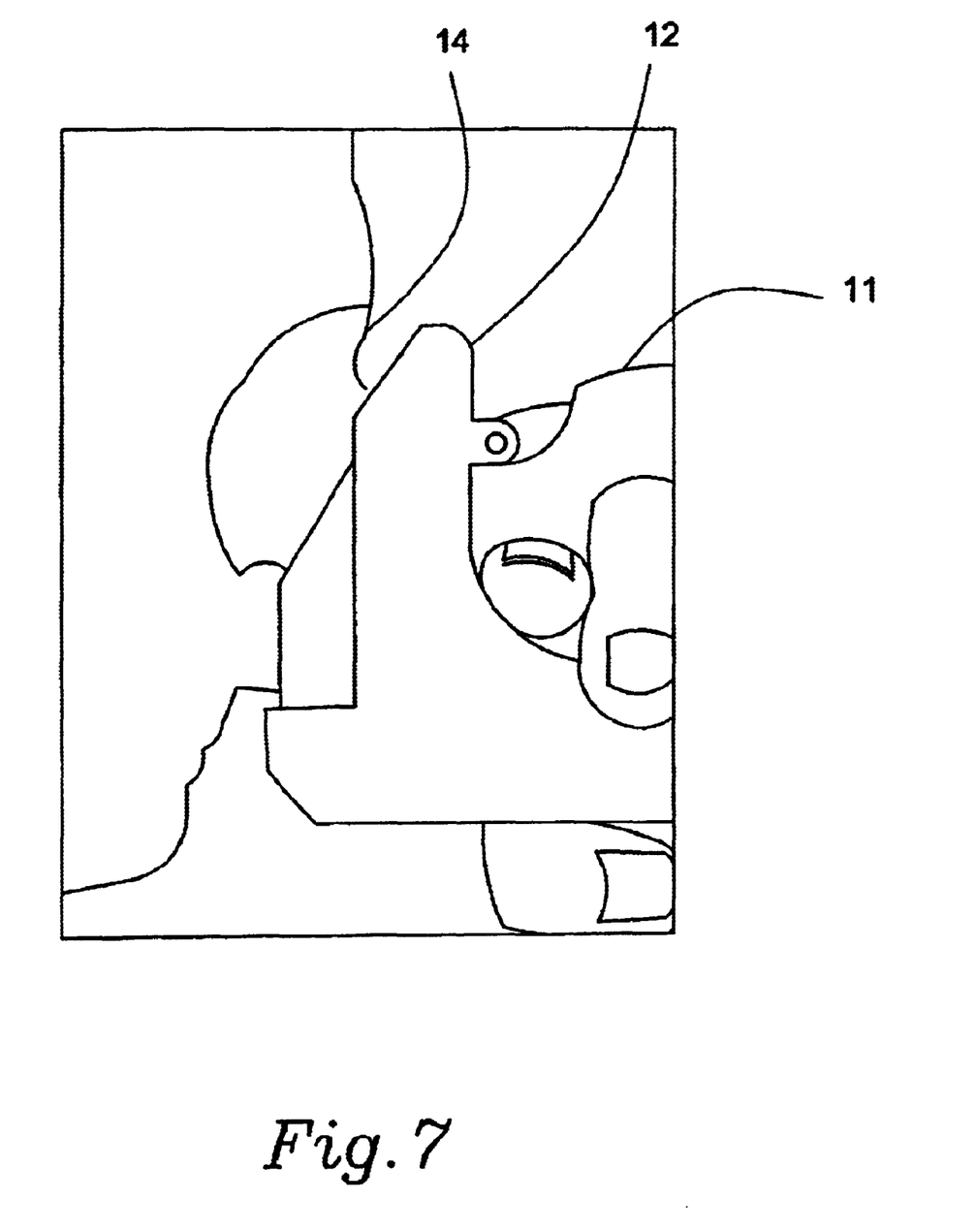
FIG. 7 is a perspective view of the portable electronic display as the operator views an image while the display is hand held.

Turning now to FIGS. 5, 6 and 7, viewer 10 is shown in various use configurations. FIG. 5 shows a viewer 10 strapped to the user's arm. As can be seen from the figure, the housing 12 is configured to conform to the generally cylindrical shape of an arm. In this position, the viewer is generally out of the way and does not obstruct the operator's performance of other tasks.

FIG. 6 shows the viewer when the operator desires to view the image. The arm is brought towards the head and the eye is placed within the eyecup 14. It is at this point that the viewing device is turned on. By only turning on the device at this point, power consumption is reduced. Various switch options are available so as to only turn on the display when required. A switch can be coupled to the eyepiece 14 so that when the operator presses his face against the eyecup 14, the switch is engaged and power is delivered. A hand operated switch could be located anywhere on the housing 12 and would simply allow the user to turn the device on and off at will. A timer could be incorporated to automatically shut down the display after a set period of time. Finally, a sensor could be incorporated which detects the presence of the eye or face of the operator and subsequently powers up the device.

Alternatively, the display can be carried in a pocket or a backpack and is simply removed and held when viewing is desired. FIG. 7 shows how the display can be viewed when the device is not strapped to the arm, but rather held by the hand.

Referring back to FIG. 4, a variety of alternative embodiments and use configurations have been envisioned. For example, the viewer 10 could also be incorporated into or with a cellular telephone. Not only would the user have a direct audio link but a direct interconnection with a distant stand alone computer as well. By incorporating the transmitter and receiver with cellular technology, the distance between the computer and the display can be greatly increased. Alternatively, the configuration shown in FIG. 4 could be modified to provide multiple viewers 10, each linked with a single computer 58. This would give a plurality of people instant access to the same information. Of course, the nature of the viewer 10, as shown in FIG. 1 makes it ideal to share a single viewer among a plurality of people as well.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments which have been described in detail therein. Rather, reference should be made to the appended claims as indicative of the scope and content of the present invention.

What is claimed is:

1. A portable electronic video display comprising a housings, a display mounted in said housing, an optics assembly coupled to said display wherein said optics assembly includes a field flattening lens, a color shutter, a reflective folding prism and a doublet lens mounted in optical alignment with the display, and an RF receiver coupled to said display for receiving a signal from a source and inputting the signal to said display.

2. A portable electronic video display according to claim 1, further including a data input control mounted to said housing and coupled to a transmitter for sending control signals to a stand alone computer.

3. A portable electronic video display according to claim 1, wherein said display comprises an electroluminescent color sequential display.

4. A portable electronic video display according to claim 3, further including an LCD color shutter coupled to said display.

5. A portable electronic video display according to claim 1, wherein the housing comprises an enclosed chamber and a viewing opening, wherein the viewing opening comprises an eyepiece configured such that an eye region of the operator may be placed proximate the eyepiece, and further wherein the portable electronic video display comprises a power switch coupled to the eyepiece so that power is only delivered to the display when the power switch is engaged.

6. A portable electronic video display according to claim 1, wherein the source further includes a stand alone computer remotely linked to the portable electronic video display.

7. A portable electronic video display according to claim 6, further having a VGA connector of the computer connected to a RF data transmitter, the transmitter including an analog to digital converter for converting an analog video signal generated by the computer into a digital signal transmittable by the transmitter.

8. A portable electronic video display according to claim 7, including an antenna coupled to the receiver, wherein the digital signal sent by the transmitter is received by the receiver through the antenna and converted into an analog signal and sent to the display.

9. A portable electronic video display for use in conjunction with a computing device, comprising:

a housing configured to be worn on a part of the human body;

a receiver mounted in said housing;

a color sequential video display coupled to said receiver for displaying a video image of a signal received by the receiver;

a LCD color subtractive shutter optically aligned with the video display;

an optics assembly coupled to the display for allowing an operator to view the image generated by the display wherein the optics assembly includes a field flattening lens interposed between the display and the LCD shutter, a reflective folding prism, and a doublet lens optically aligned with the display for providing a viewable image to an operator; and a data input control mounted to the housing and including a transmitter for transmitting control signals to a remote computer.

10. A portable electronic video display according to claim 9, further including a stand alone computer remotely linked to the portable electronic video display.

11. A portable electronic video display according to claim 10, further having a VGA connector of the computer connected to a RF data transmitter, the transmitter including an analog to digital converter for converting an analog video signal generated by the computer into a digital signal transmittable by the transmitter.

12. A portable electronic video display according to claim 11, including an antenna coupled to the receiver, wherein the digital signal sent by the transmitter is received by the receiver through the antenna and converted into an analog signal and sent to the display.

13. A computer system comprising:

a computer having a video output coupled to an analog to digital converter, a transmitter coupled to the analog to digital converter for sending a video signal, and a receiver for receiving control signals from a remote source;

a display having a housing configured to be worn on a part of the human body;

a receiver mounted in said housing for receiving video signals from the transmitter;

a video display coupled to said receiver for displaying a video image of a signal received by the receiver;

an optics assembly coupled to the display for allowing an operator to view the image generated by the display, wherein the optics assembly includes a field flattening lens, a reflective folding prism, and a doublet lens optically aligned with the display for providing a viewable image to an operator; and a data input control mounted to the housing and including a transmitter for transmitting control signals to the computer.

* * * * *